Oct. 21, 1969
F. W. BAILEY
3,473,522
GAS MILEAGE BOOSTER
Filed Aug. 11, 1966
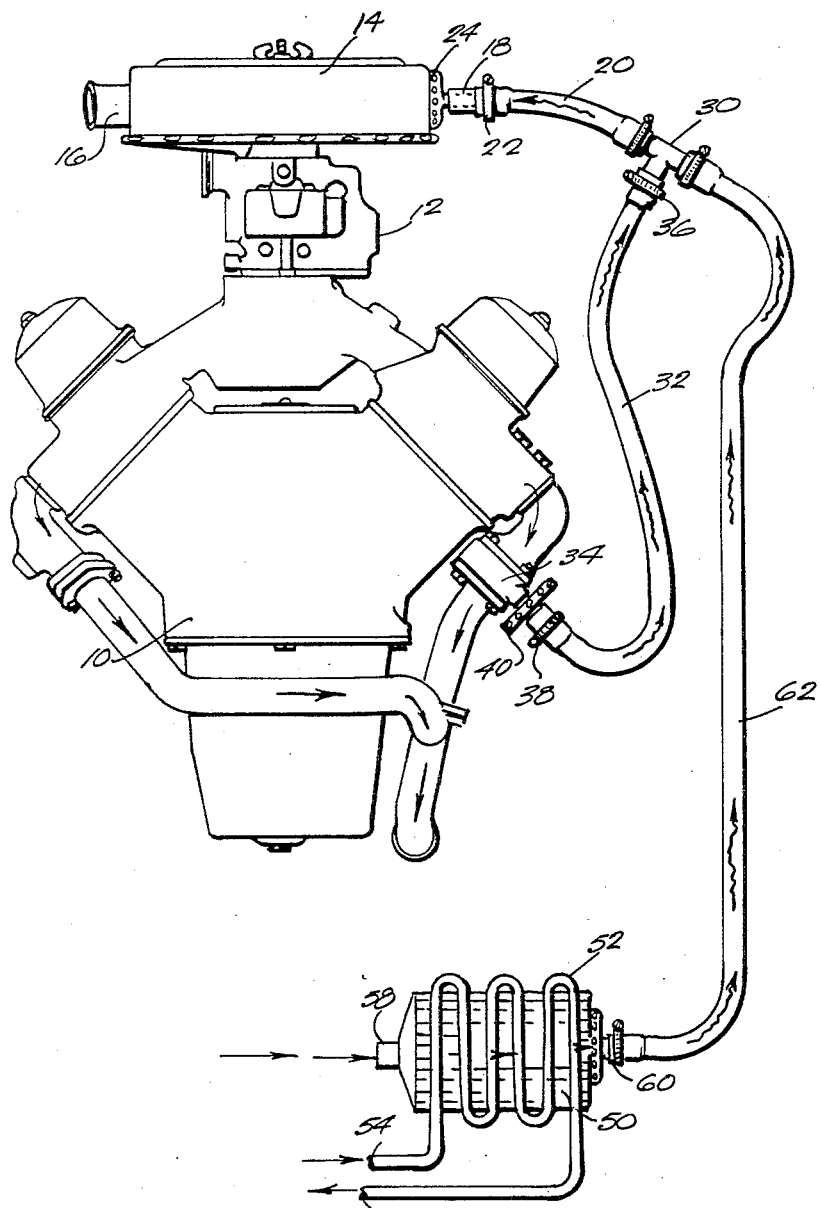
INVENTOR.
FERRALL W. BAILEY
BY
Victor J. Evans & Co
ATTORNEYS United States Patent Office 3,473,522
Patented Oct. 21, 1969

3,473,522
GAS MILEAGE BOOSTER
Ferrall W. Bailey, Sheridan, Ind., assignor of one-fifth interest to John W. Donaldson, Lebanon, Ind.
Filed Aug. 11, 1966, Ser. No. 571,796
Int. Cl. F02m 31/08
U.S. Cl. 123—122                                    1 Claim

ABSTRACT OF THE DISCLOSURE

A gas mileage booster where exhaust manifold of the engine provides a source of hot aid provided by the hot air traveling through the manifold to the air filter of the engine without apertures in the manifold, and takes in or receives only the outside preheated air from the sides of the manifold through apertures in the connector. Heating is accomplished through a tube into a T-connection where heat is proportioned with cool air, not hot air, forming improved conditions before entering the breather of the carburetor of the intake manifold of the engine.

---

The present invention relates to a gas mileage booster for gasoline engines in which increased efficiency and improved combustion resulting in better gas mileage rates is achieved, and more particularly, the invention relates to providing hose connections for conveying heated air from the manifold and from a hot air heater so that the air is preheated before it is applied to the carburetor of such gasoline engine.

An object, therefore, of the invention is to provide for flexible hose connections for conveying hot air from the manifold and from the hot air heater to the breather means for the gasoline engine so that the air is adequately preheated before being applied and directed to the carburetor.

A further object of the invention is to provide a simple and inexpensive arrangement for pre-heating air as it is applied to a breather of a gasoline engine.

A further object of the present invention is to provide small apertures and holes in and around the breather connection, above the manifold connection, as well as peripheral to the hot air heater connection for the flexible tubing, so that added inflow of clean air is also provided to the air being conveyed by the flexible tubing to the breather apparatus and carburetor.

Further advantages and features and objects of the invention will be apparent hereinafter and will appear from the description of the drawing, in which:

The figure shows a front end view of a gasoline combustion engine having a breather and certain flexible hose connections and tubing in accordance with the present invention.

Referring now to the drawing, there is shown a gasoline combustion engine 10 having a carburetor 12 for feeding a combination of gas and air to the engine 10 in a manner well known, and there is mounted thereon a breather 14 for providing filtered fresh air to the carburetor 12. While the breather 14 has its conventional intake 16, it also is provided with a hose input connection 18 so that a flexible hose 20 may be connected thereto and secured by a bracket 22. The connection includes a series of peripherally disposed openings or apertures 24 to add for further inflow of clean air to the breather 14.

The hose 20 is connected to a T-connection 30 which conducts or conveys hot air through a flexible tubing 32 from the manifold 34 into the flexible hose 20 and thence into the breather 14. Each end of the hose 32 terminates in a connection maintained in place by a bracket 36, 38, respectively, and there is provided an auxiliary air intake 40 for providing additional air intake through the small openings therein into the small amount of heated air of the manifold 34 which is bled off into the flexible connection 32.

There is additionally shown in the drawings a heater 50 which includes a closed loop hot water coil heater 52 having an in pipe 54 and an out pipe 56 connected to the water cooling system (not shown) in a manner as is well known. Air is applied to the cool side of the heater 50 at inlent 58, and it is heated while it passes over the coils 52, and is taken off at the outlet 60, which is additionally provided with a series of peripheral apertures for added inflow of free air, and the air is conveyed from coupling 60 through a flexible hose connection 62 to the T 30.

It is seen that by the bleeding of heated air from the manifold 34, and from the provision of heated clean air from the passage thereover of coils 52 of the heater 50, such heated air being applied to the hose connection 18 of the breather 14, that increased and significant and completed combustion of the air with the gasoline is achieved in the gasoline engine 10. Thus, the hot air applied to the breather 14 from the manifold bleed-off connection and from the heater 50 is forced into the carburetor so that greater explosive power and combustion is achieved through vaporization with the heater 50. The invention is also operated from outside air by retaining heat from the manifold in a warm climate without the heater. In this way, the objects and advantages of the invention are realized, and it is realized that variations, modifications, and changes may be made in the sizing of the flexible tubing, the connections, the apertures for the inflow of clean air, as well as the size of the couplings and the T connection.

Variations and modifications, therefore, may be made within the scope of the invention and portions of the improvements may be used without others.

What is claimed is:

1. A gas mileage booster for a gasoline engine comprising a breather for said gasoline engine having a hose connection for providing inflow of air thereto to be fed to a carburetor for said engine; a hot air heater producing heated air from a hose connection, said heater having hot water heater coils for connection to the water cooling system of said engine; a further hose connection at the manifold of said engine to exhaust a portion of heated air therefrom; and heated air flexible tubing hose connecting said hose connection of said heater and said further hose connection of said manifold, to the hose connection of said breather to provide heated inflow of air to the carburetor; a T connection being provided in the connections between the manifold, the heater and the breather; and holes being in the breather hose connection, the manifold hose connection, and the heater hose connection, for the provision of added inflow of air into the circulation of heated air from the manifold and the heater respectively to the breather.

References Cited

UNITED STATES PATENTS

| 1,143,331 | 6/1915 | Strange et al. |
| 1,234,995 | 7/1917 | Adams. |
| 1,323,737 | 12/1919 | Brubaker. |
| 2,264,133 | 11/1941 | Funderburk. |
| 2,781,032 | 2/1957 | Sebok et al. |
| 3,024,778 | 3/1962 | Townsend. |
| 2,696,202 | 12/1954 | MacDonald. |
| 2,757,654 | 8/1956 | White. |

FOREIGN PATENTS

| 766,303 | 1/1957 | Great Britain. |

AL LAWRENCE SMITH, Primary Examiner.